US010594430B1

(12) United States Patent
Scott et al.

(10) Patent No.: US 10,594,430 B1
(45) Date of Patent: Mar. 17, 2020

(54) PHOTONIC LAMBDA SWITCHING FOR SATELLITES

(71) Applicant: The Boeing Company, Chicago, IL (US)

(72) Inventors: James P. Scott, Manhattan Beach, CA (US); Michael A. Whelan, Rancho Palos, CA (US); Bradley A. Scott, Silverado, CA (US); Dennis L. Gould, Whittier, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/392,105

(22) Filed: Apr. 23, 2019

(51) Int. Cl.
   *H04J 14/02* (2006.01)
   *H04B 10/2575* (2013.01)
   *H04B 10/118* (2013.01)
   *H04B 10/27* (2013.01)

(52) U.S. Cl.
   CPC ........ *H04J 14/0204* (2013.01); *H04B 10/118* (2013.01); *H04B 10/25755* (2013.01); *H04B 10/271* (2013.01); *H04J 14/022* (2013.01); *H04J 14/0205* (2013.01)

(58) Field of Classification Search
   CPC .. H04B 10/118; H04B 10/271; H04B 10/275; H04B 10/25755; H04J 14/0204; H04J 14/0205; H04J 14/022
   See application file for complete search history.

(56) References Cited

U.S. PATENT DOCUMENTS

| 2003/0002104 A1* | 1/2003 | Caroli ................. H04J 14/0204 398/82 |
| 2005/0105908 A1* | 5/2005 | Oikawa .................. H04B 10/27 398/85 |
| 2017/0012730 A1* | 1/2017 | Lambert ................ H04B 10/29 |

* cited by examiner

*Primary Examiner* — Casey L Kretzer
(74) *Attorney, Agent, or Firm* — MH2 Technology Law Group LLP

(57) ABSTRACT

A satellite payload system is disclosed. The satellite payload system includes a plurality of optical processing modules, each including: a module input including an optical splitter, a module output including an optical coupler, a dynamic gain equalizer, an output bank of optical filters, and an input bank of optical filters; where the plurality of optical processing modules include ring-connected optical processing modules and inter-satellite optical processing modules; and at least one optical fiber ring communicatively coupled to each of the ring-connected optical processing modules; where at least one of the ring-connected optical processing modules is configured to provide on-board signal processing of wavelengths; where a plurality of the ring-connected optical processing modules are each communicatively coupled to a respective inter-satellite optical processing module; where each inter-satellite optical processing module is configured to optically communicatively couple to a respective remote satellite via its module input and via its module output.

20 Claims, 3 Drawing Sheets

PHOTONIC LAMBDA SWITCHING FOR SATELLITES

FIELD

This disclosure relates to satellite communications.

BACKGROUND

Known satellite payloads typically operate in the electronic domain. Further, terrestrial optical systems are typically custom-built, without using modular design principles.

SUMMARY

According to various embodiments, a satellite payload system is disclosed. The satellite payload system includes a plurality of optical processing modules, each optical processing module including: a module input including an optical splitter, a module output including an optical coupler, a dynamic gain equalizer interposed between a first output of the optical splitter and a first input to the optical coupler, an output bank of optical filters coupled to a second output of the optical splitter, and an input bank of optical filters coupled to a second input of the optical coupler; where the plurality of optical processing modules include a plurality of ring-connected optical processing modules and a plurality of inter-satellite optical processing modules; and at least one optical fiber ring configured to convey a plurality of photonic wavelengths, the at least one optical fiber ring communicatively coupled to each of the ring-connected optical processing modules via respective module inputs and module outputs of the ring-connected optical processing modules; where at least one of the ring-connected optical processing modules is configured to provide on-board signal processing of wavelengths conveyed on the at least one optical fiber ring; where a plurality of the ring-connected optical processing modules are each communicatively coupled to a respective inter-satellite optical processing module via respective banks of optical filters; where each inter-satellite optical processing module is configured to optically communicatively couple to a respective remote satellite via its module input and via its module output.

Various optional features of the above embodiments include the following. For each of the plurality of optical processing modules, the respective output bank of optical filters and the respective input bank of optical filters may be dynamically tunable. Each of the plurality of optical processing modules may have identical architecture. The at least one optical fiber ring may include dual counter-rotating optical fiber rings. The at least one of the ring-connected optical processing modules may be configured to provide on-board optical signal processing of photonic data conveyed on the at least one optical fiber ring. The at least one of the ring-connected optical processing modules may be configured to provide on-board radio-frequency signal processing of electromagnetic data corresponding to wavelengths conveyed on the at least one optical fiber ring. The satellite payload system may be configured to provide selectable optical routing to a plurality of remote satellites. The satellite payload system may be configured to provide hopped radio-frequency terrestrial communications. The satellite payload system may be configured to aggregate a plurality of signals from a plurality of satellites using time division multiplexing. Each optical processing module may include radiation-hard optical materials and low outgassing structural materials.

According to various embodiments, a method performed by a satellite payload system is disclosed. The satellite payload system includes: a plurality of optical processing modules, each optical processing module including: a module input including an optical splitter, a module output including an optical coupler, a dynamic gain equalizer interposed between a first output of the optical splitter and a first input to the optical coupler, an output bank of optical filters coupled to a second output of the optical splitter, and an input bank of optical filters coupled to a second input of the optical coupler; where the plurality of optical processing modules include a plurality of ring-connected optical processing modules and a plurality of inter-satellite optical processing modules; and at least one optical fiber ring configured to convey a plurality of photonic wavelengths, the at least one optical fiber ring communicatively coupled to each of the ring-connected optical processing modules via respective module inputs and module outputs of the ring-connected optical processing modules; the method including: communicatively coupling optically, by at least one inter-satellite processing module, to a respective remote satellite via a module input of the at least one inter-satellite processing module and via a module output of the at least one inter-satellite processing module; passing, by the at least one inter-satellite processing module and to at least one of the ring-connected optical processing modules via respective banks of optical filters, wavelengths including inter-satellite data; and processing, at least in part by the at least one of the ring-connected optical processing modules, the inter-satellite data.

Various optional features of the above embodiments include the following. For each of the plurality of optical processing modules, the respective output bank of optical filters and the respective input bank of optical filters may be dynamically tunable. Each of the plurality of optical processing modules may have identical architecture. The at least one optical fiber ring may include dual counter-rotating optical fiber rings. The processing may be provided by on-board optical signal processing of photonic data conveyed on the at least one optical fiber ring. The processing may be provided by on-board radio-frequency signal processing of electromagnetic data corresponding to wavelengths conveyed on the at least one optical fiber ring. The method may include providing selectable optical routing to a plurality of remote satellites. The method may include providing hopped radio-frequency terrestrial communications. The method may include aggregating a plurality of signals from a plurality of satellites using time division multiplexing. Each optical processing module may include radiation-hard optical materials and low outgassing structural materials.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
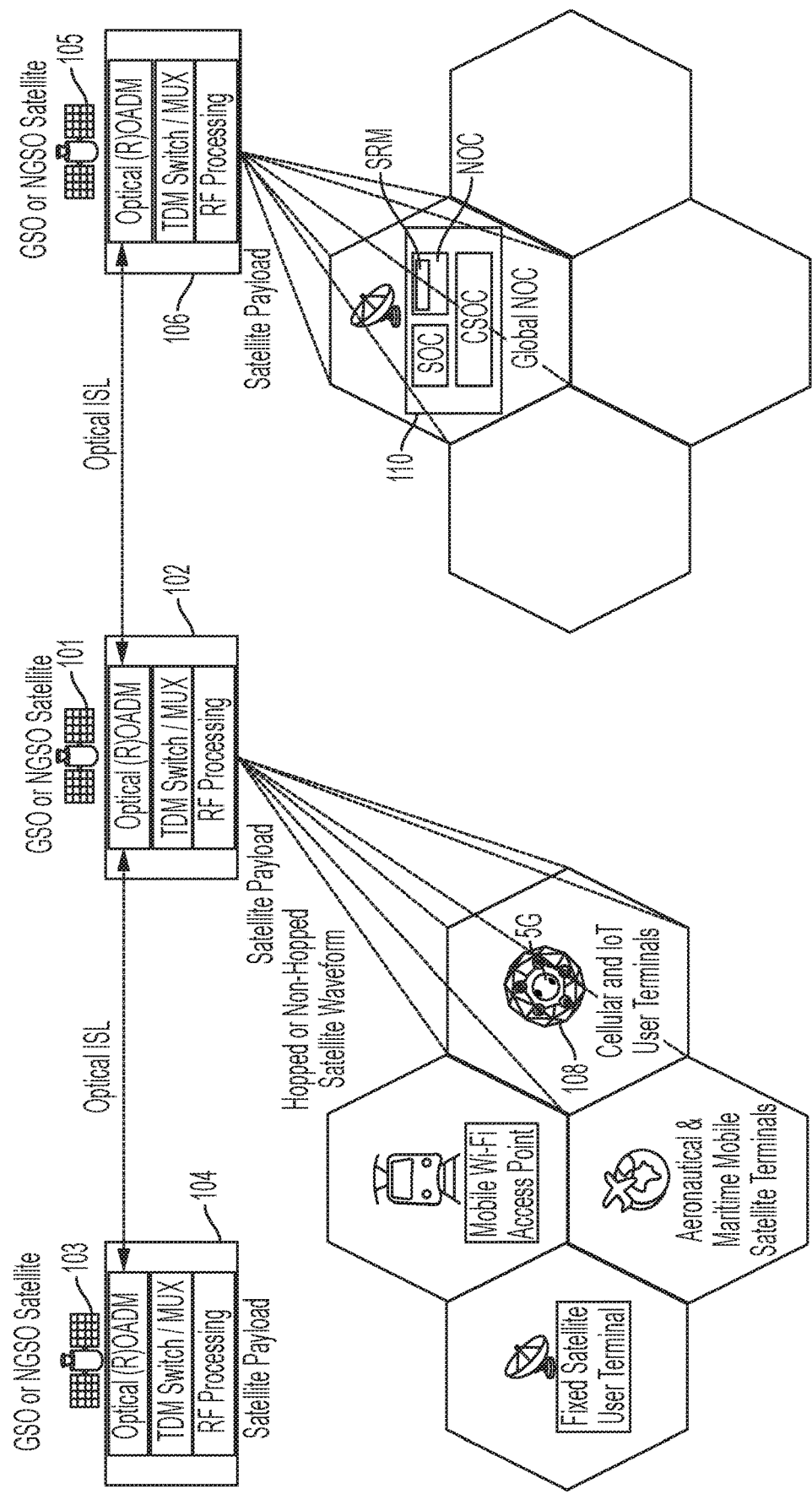
FIG. 1 is a schematic diagram of a satellite communication system that uses photonic lambda switching according to various embodiments.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Prior art satellite payloads may be analog or (electrical) digital. By contrast, some embodiments provide all or partial optical payloads. Such payloads may switch photons from one beam to another. In particular, some embodiments allow any-to-any optical beam switching in the payload. Some embodiments can switch between beams pointing at the Earth or optical crosslinks that connect between satellites.

Various embodiments provide satellite signal routing, and/or switching traffic through a satellite constellation, by processing radio frequency (RF) carriers or channels containing user traffic or system control and management traffic, aggregating the traffic using time-division multiplexing (TDM), and switching the aggregated TDM traffic to an optical wavelength. Some embodiments convert the satellite RF signal to light pulses and then back to RF for the downlink. Some embodiments utilize photonic lambda switching.

Some embodiments integrate an optical add/drop multiplexer (OADM) into a satellite payload to handle inter-satellite switching and/or routing, the aggregation of RF carriers or channels using TDM, the mapping of these aggregations onto an optical wavelength, and the routing of the resulting wavelength to a selected destination satellite payload. In some embodiments, the OADM may be reconfigurable OADM (ROADM).

Some embodiments provide single-hop functionality, as opposed to double-hop functionality. In general, in double-hop systems, a user terminal on ground sends data to the satellite. The satellite may then send the data to an Earth gateway station for advanced processing. The Earth gateway station then passes the processed data through fiber on ground to another Earth gateway system, which sends it back up to a different satellite, which may pass the data to a final destination terminal on Earth.

By contrast, some embodiments provide single-hop functionality. Satellite payloads according to some embodiments have sufficient on-board processing that the signal does not need to go back down to a gateway station for processing such as modulation/encoding/routing/switching. Such processing may instead be performed on payloads as disclosed herein. Instead of sending data to an Earth gateway system for advanced processing, some embodiments utilize inter-satellite links. Thus, data can go from a ground-based terminal up to a satellite, and not return back to Earth until it gets to end of the path, at an Earth destination terminal. Such embodiments solve the problem of efficiently routing and/or switching traffic through a constellation of non-geostationary orbit (NGSO) satellites or through a hierarchical constellation that contains some combination of low Earth orbit (LEO), medium Earth orbit (MEO), and geostationary orbit (GEO) satellites.

The optical or partially-optical payloads of some embodiments have superior size, weight, and power (SWaP) properties in comparison to known satellites payloads. In general, optical hardware is lighter than electronic hardware, so embodiments can do more processing with the same weight. Embodiments may utilize erbium doped fiber amplifiers inside optical transceivers, which can pack more wavelengths into the links. Such embodiments may provide greater routing capabilities through the optical backbone in space, in comparison to entirely electronic-based systems. Further, optical hardware as disclosed herein provides good signal immunity between different signal paths.

FIG. 1 is a schematic diagram of a satellite communication system that uses photonic lambda switching according to various embodiments. The system as shown includes a constellation of three satellites 101, 103, 105, which may be in geostationary or non-geostationary (e.g., LEO or MEO) orbits.

Each satellite 101, 103, 105 includes a respective payload 101, 104, 106. Payloads 102, 104, 106 provide photonic lambda switching. In particular, each payload 102, 104, 106 includes an optical add-drop multiplexor (OADM), which may be a reconfigurable OADM (ROADM). Each payload 102, 104, 106 includes a TDM switch/multiplexor (MUX). The TDM switch/MUX may be entirely optical, or may process in the RF domain. Each payload 101, 104, 106 also includes signal processing circuitry, which may process signals in the RF domain, or, alternately, entirely in the optical domain.

Satellite 101 is shown as having optical inter-satellite links (OISL) with satellites 103 and 105, respectively. The ISL may be static, dynamic, or extremely dynamic. A static ISL may be between satellites within the same orbital plane. Such satellites may have satellites in front and behind that will constantly be in view. A dynamic ISL may be between satellites in adjacent orbital planes. Such satellites may be in view of each-other for, e.g., 15 minutes or so at a time. An extremely dynamic ISL may be between satellites in adjacent planes in the seam. Such satellites may be in view of each-other for only a few seconds at a time.

The ISL may utilize coarse wavelength division multiplexing (CWDM, e.g., 8 or 16 channels per link) dense WDM (DWDM, e.g., 32, 64 or 128 channels per link) or ultra-dense WDM (UDWDM, e.g., 192 or more channels per link).

Embodiments may utilize constraint-based wavelength routing. Such routing may utilize multiple wavelengths between multiple satellites from one end of the system to the other.

As depicted in FIG. 1, the satellites may communicate with a variety of entities on the ground. Satellites 101 and 105 are shown laying down beams on the Earth. Such communications may be RF and/or optical. Generally, downlinks to Earth are RF. Further, in general, optical communication links may be between satellites. Satellite 101 is shown communicating with cellular and internet-of-things user terminal 108. However, embodiments are not so limited. Further ground-based entities that satellite 101 may communicate with include mobile WiFi access points, aeronautical and maritime mobile satellite terminals, fixed satellite user terminals, and other entities.

Satellite 106 is further shown as communicating with a global network operations center (global NOC) 110. Such a global NOC 110 is shown as including a satellite operations center (SOC) and a cyber-security operations center (CSOC). The CSOC provides surveillance and monitoring in order to ensure that the system is secure. The global NOC also includes a network operations center (NOC), which may include a system resource manager (SRM).

The SRM may be a distributed entity including a global SRM that receives operator inputs and constraints, and other external constraints (e.g., global weather, ephemeris data from external systems operating in the same frequency bands), and produces global and regional resource management policies that are disseminated to distributed SRM clients that reside on each satellite payload, ground gateway, and user terminal. These disseminated policies are used by the local payload, gateway, and terminal SRM clients to create local configuration information related to beam, carrier, and switching/forwarding functions. The SRM clients may also feed key performance indicator data back to the global SRM for continuous optimization of the system resource allocation and system performance.

The SRM may support hopped and non-hopped beams. In general, non-hopped beams utilize static beams, each which has a different frequency band and is statically assigned to a different cell on the Earth. The use of different frequency bands provides the benefit of no interference at the edges of the cells. Static non-hopped beams are useful as long as the population of users is static and always demands the same access to the system. But mobile systems, for example, may have changing demand requirements and changing access needs per time of day, which means that such systems may have different demands in different cells at different points in time.

Hopped beams utilize beams of different frequency bands in different places at different times. For hopped beams, different cells are energized at different points in time. Beam hopping provides for increased system capacity by giving different users different access to the system at different times according to a spatial permutation. Instead of having a multiple fully-energized beams according to a non-hopped beam system, which may or may not be used at different times, hopped beam system utilize frequency division multiplexing (FDM) that gets mapped to the TDM. The TDM is used to multiplex traffic up onto different optical wavelengths, and the beam hopping uses FDM that splits the spectrum up into different channels, then hops among those channels. Thus, beam hopping allows for servicing dynamic demands in an efficient way. Hopping can be intelligent, or known pattern, based on what the customers say they will need.

The SRM provides for intelligent beam hopping. The system feeds real-time data from the ground-based terminals into the SRM. SRM then uses this data to determine how to modify the beam hopping pattern to increase efficiency of the system over time.

According to various embodiments, the optical ISLs can use multi-wavelength interconnections (where the SRM determines the end-to-end path using a routing and wavelength assignment algorithm) or the optical ISLs can use a single coherent laser, where all traffic between adjacent satellites is carried using a single wavelength. The former is optimized for circuit switched networks, while the latter approach is optimized for packet switched networks, for example.

Figure 2:
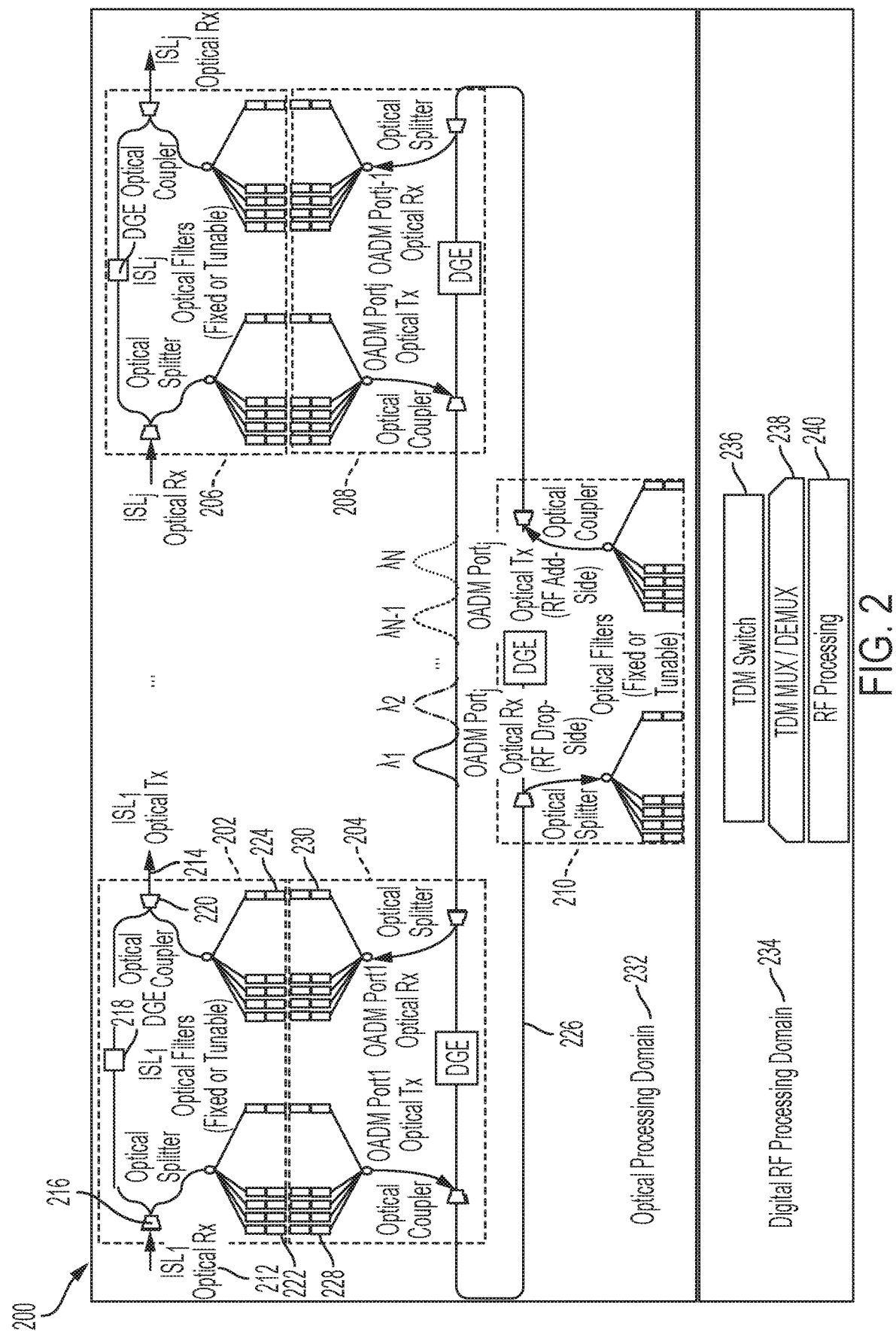
FIG. 2 is a schematic diagram of a satellite payload system that uses photonic lambda switching according to various embodiments.

FIG. 2 is a schematic diagram of a satellite payload system 200 that uses photonic lambda switching according to various embodiments. The satellite payload system 200 may be included in satellites 101, 103, 105 of FIG. 1, for example. The system 200 is transparent to the waveforms used (e.g., hopped, non-hopped, TDM, FDM, CDMA, etc.).

The satellite payload system 200 may be based around optical processing modules 202, 204, 206, 208, 210. Multiple such optical processing modules may be manufactured to have identical architecture. In this manner, the satellite payload system 200 may be efficiently designed and manufactured. For example, the optical processing modules 202, 204, 206, 208, 210 may be built using a reproducible assembly process. Thus, the optical processing modules 202, 204, 206, 208, 210 may be reusable design components that are replicated at every add/drop point in the broadcast-and-select switch design. Such reuse reduces cost and increases manufacturing and space-qualification efficiencies.

Example internal architecture of the optical processing modules 202, 204, 206, 208, 210 is described in reference to optical processing module 202; however, the description applies to the remaining optical processing modules 204, 206, 208, 210 according to some embodiments. Optical processing module 202 includes an input 212 and an output 214. The input 212 and output 214 may include physical ports for coupling optical transmission lines and conveying optical signals to the optical processing module 202. The input 212 may be coupled to an input of an optical splitter 216 in the optical processing module 202. The optical splitter 216 has one input and two outputs. One output of the optical splitter 216 may be coupled to a dynamic gain equalizer (DGE) 218. The DGE 218 assists in drop/add multiplexing as further described below. The output of the DGE 218 is coupled to an input of an optical coupler 220. The optical coupler 220 has two inputs and one output. The output of the optical coupler 220 is provided to the output 214 of the optical processing module 202.

The other output of the optical splitter 216 is coupled to an bank of output optical filters 222. The output optical filters 222 may be fixed or tunable. Embodiments that utilize tunable optical filters 222 can dynamically change the routing through the optical backbone of the satellite constellation. That is, embodiments that utilize tunable optical filters 222 include ROADM functionality. The number of optical filters may correspond to the number of remote satellites with which the satellite communicates. The output optical filters 222 may include one or more physical ports for coupling optical transmission lines and conveying optical signals.

The other input to the optical coupler 220 is coupled to a bank of input optical filters 224, which may match the bank of output optical filters 222. The input optical filters 224 may be fixed or tunable, providing OADM or ROADM functionality. The input optical filters 224 may include one or more physical ports for coupling optical transmission lines and conveying optical signals.

Thus, the optical processing module 202 includes an input 212 for receiving optical wavelengths, an output 214 for transmitting optical wavelengths, a bank of input optical filters 224 for coupling with a corresponding bank of output optical filters of another optical processing module, and a bank of output optical filters 222 for coupling to a bank of input optical filters of another optical processing module.

The optical and photonic components include features to facilitate operation in the high-radiation, vacuum, and low-gravity environments that characterize space. These features include, any, or any combination, of: the use of radiation-hard optical materials (e.g., glasses, crystals, liquid crystals, and waveguides), the replacement of high out-gassing polymers and adhesives with low outgassing materials (e.g., for structural components), the elimination of materials that degrade in high radiation environments with radiation tolerant materials, mitigations to prevent the formation of conductive whiskers, thermal management to eliminate dependence on convection for heat transfer, and implementation of design features to allow operation in a vacuum environment. Such design features for operation in a vacuum include venting to facilitate the transition to vacuum and to eliminate vacuum induced stresses, hermetic sealing to maintain internal pressure and gas content, and optimized optical designs to allow operation in both ambient pressure and vacuum environments.

The satellite payload system 200 further includes dual counter-rotating optical fiber rings 226. The optical fiber rings may include a primary optical fiber ring and a secondary optical fiber ring for redundancy. Both rings have same connections to rest of the system. The redundant rings may be interconnected such that if one ring goes down, then the other takes over as the new primary ring. The optical fiber rings 226 may utilize DWDM or UDWDM. As described in detail herein, when used in tandem with the optical modules, the optical fiber rings 226 allow traffic to be switched from one wavelength on a given external interface to a different wavelength on a different external interface. That is, the optical fiber rings 226 at least partially perform optical switching on the payload by switching wavelengths within them. Note that the bandwidth of embodiments can be scaled either using more wavelengths per optical fiber ring or by using additional interconnected optical fiber rings.

The optical processing modules 202, 204, 206, 208, 210 may be classified as ring-connected optical processing modules or inter-satellite optical processing modules, depending on whether their respective inputs and outputs are coupled to the optical fiber rings 226 or are used for inter-satellite links. Thus, the optical processing modules 204, 208, 210 are ring-connected optical processing modules, whereas the optical processing modules 202, 206 are inter-satellite optical processing modules.

The inter-satellite optical processing modules 202, 206 are coupled to corresponding ring-connected optical processing modules 204, 208, respectively, via their respective optical filter banks. Thus, the bank of output optical filters 222 of the inter-satellite optical processing module 202 is communicatively coupled to the bank of input optical filters 228 of the ring-connected optical processing module 204. Further, the bank of input optical filters 224 of the inter-satellite optical processing module 202 is communicatively coupled to the bank of output optical filters 230 of the ring-connected optical processing module 204.

The ring-connected optical processing module 210 provides processing of data on the wavelengths picked up from the optical fiber rings 226. Such processing may be entirely within the optical domain 232 according to some embodiments. Alternately, according to some embodiments, the processing is performed in the RF domain 234. According to such embodiments, the banks of optical filters of the optical processing module 206 are coupled to RF processing circuitry. Such RF processing circuitry may include, as shown in FIG. 2, a TDM switch 236, a TDM modulator/demodulator 238, and dedicated RF processing circuitry 240.

The optical processing modules 202, 204, 206, 208, 210 and optical fiber ring 226 of system 200 may be conceptualized as including a through path, which includes traffic going to an adjacent satellite, and a drop path, which includes traffic dropped for local processing. In particular, the optical splitter 216 of the optical processing module 202 splits the received ISL signal into a through path and a drop path. The through path traffic runs into the 218 DGE, which selects the wavelength(s) that are to be dropped, and filters them out of the through path. The DGE 218 thus filters the traffic that is dropped, so that those wavelengths no longer exist in the through path. All that remains in the through path that goes to the optical coupler 220 are the signals that were received that were not dropped for processing. These wavelengths are sent to the optical coupler 220.

The drop path from the optical splitter 216 passes waveforms to the ring-connected optical processing module 204, which passes such waveforms to the optical fiber rings 226. Such waveforms may be processed optically by the ring-connected optical processing module 210 or processed in the RF domain 234 using TDM switch 236, TDM MUX/DEMUX 238, and RF processor 240. The processed waveforms are then added to the optical fiber rings 226 via the optical coupler of the ring-connected optical processing module 210. More particularly, processed waveforms are picked off of the optical fiber rings 226 by the ring-connected optical processing module 204 and passed to the inter-satellite optical processing module 202 via their respective banks of optical filters. At the optical coupler 220, the dropped wavelengths that have been processed on-board, whether in the RF domain 234 or entirely within the optical domain, are added to the signal of the through path for transmission to the adjacent satellite. These signals get transmitted on the ISL. (Note that some waveforms on the drop path are destined for Earth terminals on the ground, and those are not re-added to go to the ISL.) In sum, the DGE 218 filters out all the waveforms on the optical fiber rings 226 that have been dropped for processing, and then on the other side of the DGE 218, the optical coupler 220 re-adds the appropriate waveforms that have been processed and acquired from the optical fiber rings 226, to go out to the ISL via the output 214. Thus, the DGE 218 performs at least some drop functionality, and the optical coupler 220 performs at least some add functionality.

Some embodiments provide a grooming function where traffic to/from different RF beams or optical wavelengths can be groomed onto different optical wavelengths. Such grooming may be performed optically or partially in the RF domain, as disclosed presently.

Some embodiments can change the wavelength of traffic entirely optically, that is, without entering the RF domain. To do so, such embodiments may utilize banks of optical filters 222, 224 that are tunable. Such embodiments may use such tunable optical filter for a switching function. For example, traffic at a first wavelength may be directed to the drop path via the optical splitter 216. The traffic may enter the bank of optical filters 222 and be selected by the filter of the corresponding wavelength from the bank of optical filters 222. The corresponding filter of the receiving bank of optical filters 228 can tune the corresponding receiving filter to a second wavelength, different from the first wavelength. The traffic from the second wavelength may then enter the optical fiber rings 226 at the second wavelength via the optical coupler of the ring-connected optical processing module 204.

Alternately, some embodiments may change wavelengths by running the signal through an electrical conversion process using the TDM switch 236. According to such embodiments, as traffic pulled off at one wavelength, the wavelength is changed in the RF domain 234, and the changed wavelength is then re-added.

Figure 3:
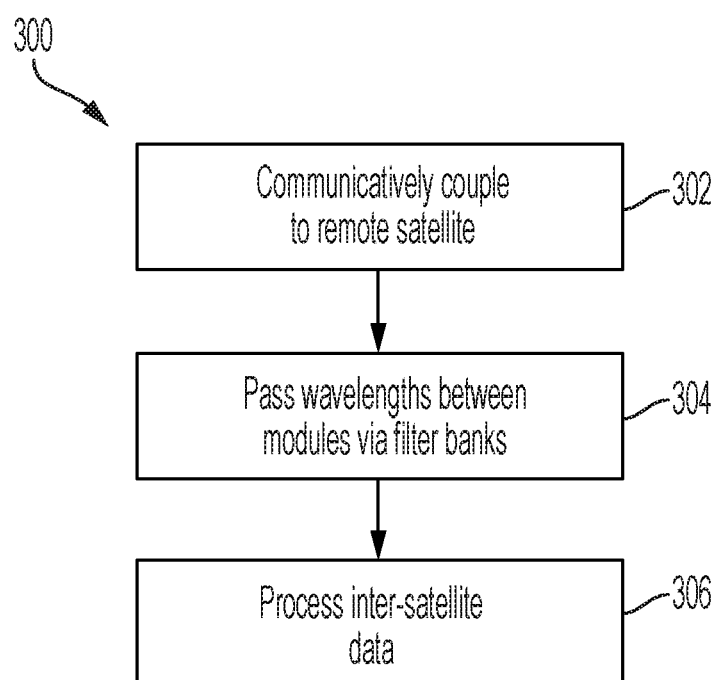
FIG. 3 is a flow diagram of a method of satellite photonic lambda switching according to various embodiments.

FIG. 3 is a flow diagram of a method 300 of satellite photonic lambda switching according to various embodiments. The method 300 may be performed by a system such as satellite payload system 200, which may be deployed in a satellite such as satellite 101, 103 or 105.

At block 302, the system 200 communicatively couples to a remote satellite via an inter-satellite link. Such a link may be provided using, for example, an input and output of an inter-satellite optical processing module (e.g., optical processing module 202) of the system 200. The link may be purely optical. The link may include two components, one for transmission and another for reception. Standard optical elements may be used to locate, transmit, and receive optical wavelengths with the remote satellite.

At block 304, the system 200 passes received optical wavelengths from the receiving inter-satellite optical processing module (e.g., optical processing module 202) to a ring-connected optical processing module (e.g., optical processing module 204. The system 200 may pass the wavelengths via their respective banks of optical filters (e.g., 224, 230).

At block 306, the system 200 processes the traffic received over the ISL. The processing may include wavelength changing, modulation, encoding, routing, and/or switching. The processing may be performed entirely in the optical domain, or partially in the RF domain (e.g., 234).

Once processed, the signal may be re-added to the optical fiber rings 226, picked up by an optical processing module (e.g., 206), and sent to a different remote satellite from the satellite from which it was received prior to processing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A satellite payload system comprising:
 a plurality of optical processing modules, each optical processing module comprising:
  a module input comprising an optical splitter,
  a module output comprising an optical coupler,
  a dynamic gain equalizer interposed between a first output of the optical splitter and a first input to the optical coupler,
  an output bank of optical filters coupled to a second output of the optical splitter, and
  an input bank of optical filters coupled to a second input of the optical coupler;
  wherein the plurality of optical processing modules comprise a plurality of ring-connected optical processing modules and a plurality of inter-satellite optical processing modules; and
 at least one optical fiber ring configured to convey a plurality of photonic wavelengths, the at least one optical fiber ring communicatively coupled to each of the ring-connected optical processing modules via respective module inputs and module outputs of the ring-connected optical processing modules;

wherein at least one of the ring-connected optical processing modules is configured to provide on-board signal processing of wavelengths conveyed on the at least one optical fiber ring;

wherein a plurality of the ring-connected optical processing modules are each communicatively coupled to a respective inter-satellite optical processing module via respective banks of optical filters;

wherein each inter-satellite optical processing module is configured to optically communicatively couple to a respective remote satellite via its module input and via its module output.

2. The satellite payload system of claim 1, wherein for each of the plurality of optical processing modules, the respective output bank of optical filters and the respective input bank of optical filters are dynamically tunable.

3. The satellite payload system of claim 1, wherein each of the plurality of optical processing modules have identical architecture.

4. The satellite payload system of claim 1, wherein the at least one optical fiber ring comprises dual counter-rotating optical fiber rings.

5. The satellite payload system of claim 1, wherein the at least one of the ring-connected optical processing modules is configured to provide on-board optical signal processing of photonic data conveyed on the at least one optical fiber ring.

6. The satellite payload system of claim 1, wherein the at least one of the ring-connected optical processing modules is configured to provide on-board radio-frequency signal processing of electromagnetic data corresponding to wavelengths conveyed on the at least one optical fiber ring.

7. The satellite payload system of claim 1, configured to provide selectable optical routing to a plurality of remote satellites.

8. The satellite payload system of claim 1, configured to provide hopped radio-frequency terrestrial communications.

9. The satellite payload system of claim 1, configured to aggregate a plurality of signals from a plurality of satellites using time division multiplexing.

10. The satellite payload system of claim 1, wherein each optical processing module comprises radiation-hard optical materials and low outgassing structural materials.

11. A method performed by a satellite payload system, the satellite payload system comprising:

a plurality of optical processing modules, each optical processing module comprising:
  a module input comprising an optical splitter,
  a module output comprising an optical coupler,
  a dynamic gain equalizer interposed between a first output of the optical splitter and a first input to the optical coupler,
  an output bank of optical filters coupled to a second output of the optical splitter, and
  an input bank of optical filters coupled to a second input of the optical coupler;

wherein the plurality of optical processing modules comprise a plurality of ring-connected optical processing modules and a plurality of inter-satellite optical processing modules; and at least one optical fiber ring configured to convey a plurality of photonic wavelengths, the at least one optical fiber ring communicatively coupled to each of the ring-connected optical processing modules via respective module inputs and module outputs of the ring-connected optical processing modules;

the method comprising:

communicatively coupling optically, by at least one inter-satellite processing module, to a respective remote satellite via a module input of the at least one inter-satellite processing module and via a module output of the at least one inter-satellite processing module;

passing, by the at least one inter-satellite processing module and to at least one of the ring-connected optical processing modules via respective banks of optical filters, wavelengths comprising inter-satellite data; and processing, at least in part by the at least one of the ring-connected optical processing modules, the inter-satellite data.

12. The method of claim 11, wherein for each of the plurality of optical processing modules, the respective output bank of optical filters and the respective input bank of optical filters are dynamically tunable.

13. The method of claim 11, wherein each of the plurality of optical processing modules have identical architecture.

14. The method of claim 11, wherein the at least one optical fiber ring comprises dual counter-rotating optical fiber rings.

15. The method of claim 11, wherein the processing is provided by on-board optical signal processing of photonic data conveyed on the at least one optical fiber ring.

16. The method of claim 11, wherein the processing is provided by on-board radio-frequency signal processing of electromagnetic data corresponding to wavelengths conveyed on the at least one optical fiber ring.

17. The method of claim 11, further comprising providing selectable optical routing to a plurality of remote satellites.

18. The method of claim 11, further comprising providing hopped radio-frequency terrestrial communications.

19. The method of claim 11, further comprising aggregating a plurality of signals from a plurality of satellites using time division multiplexing.

20. The method of claim 11, wherein each optical processing module comprises radiation-hard optical materials and low outgassing structural materials.

* * * * *